(No Model.)

C. TAYLOR.
TIRE.

No. 601,763. Patented Apr. 5, 1898.

Witnesses

Inventor
Charles Taylor
By his Attorney

THE NORRIS PETERS CO., PHOTO-LITHO., WASHINGTON, D. C.

UNITED STATES PATENT OFFICE.

CHARLES TAYLOR, OF MONTREAL, CANADA, ASSIGNOR OF TWO-THIRDS TO GEORGE SAUNDERSON, OF SAME PLACE, AND GEORGE PLUNKETT MAGANN, OF TORONTO, CANADA.

TIRE.

SPECIFICATION forming part of Letters Patent No. 601,763, dated April 5, 1898.

Application filed September 14, 1896. Serial No. 605,795. (No model.)

*To all whom it may concern:*

Be it known that I, CHARLES TAYLOR, of the city of Montreal, in the district of Montreal and Province of Quebec, Canada, have invented certain new and useful Improvements in Tires; and I do hereby declare that the following is a full, clear, and exact description of the same.

My invention, although applicable to all kinds of tires, is especially adapted to bicycle-tires; and the object thereof is to provide a tire that will be lighter and more durable than tires at present in use, besides having the advantage of enabling the resiliency thereof to be regulated to accommodate a light or a heavy rider.

To these ends the invention may be said, briefly, to consist in constructing the tire of an inner rim and an outer tread, between which a series of springs are mounted, the tension of such springs being variable; and the invention further consists in the particular means for retaining such springs in their places and for securing the adjustment thereof, besides other points of novelty, which will be hereinafter fully set forth, reference being had to the accompanying drawings, forming a part of this specification, wherein like symbols indicate the same parts, and in which—

Figure 1:
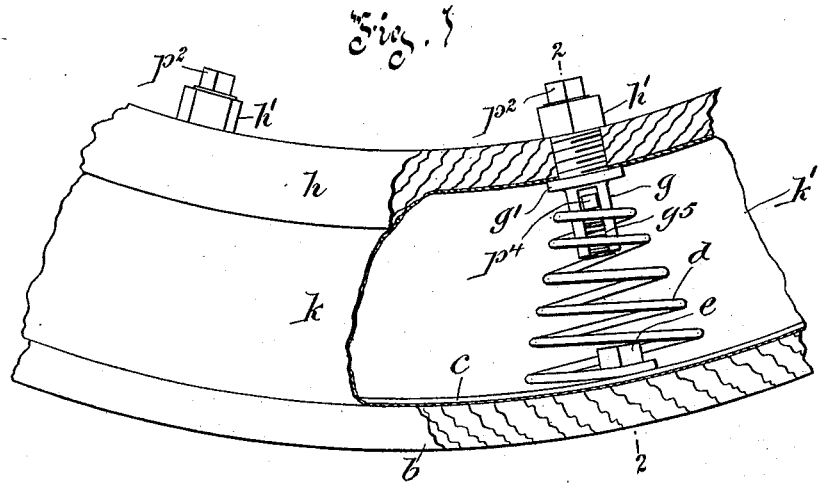
Figure 2:
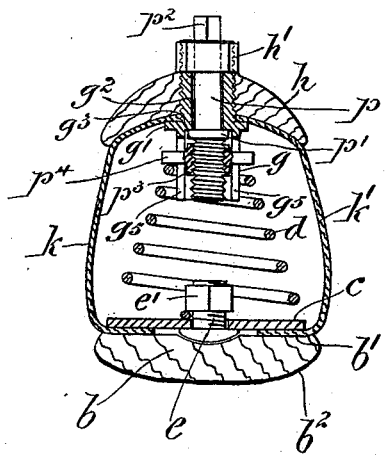

Figure 1 is a side elevation, partly in section, of a tire constructed according to my invention; and Fig. 2, a transverse vertical sectional view thereof, taken on line 2 2, Fig. 1.

The tread of my tire consists of an annulus $b$, of rubber, having a flat inner surface $b'$ and a convex tractional surface $b^2$, which is secured about a (preferably flat) resilient annulus $c$, having a series of preferably conical helical springs $d$, each secured thereto by a screw-threaded bolt $e$, passing through such annulus $c$ and having a nut $e'$ screwed thereon, between which nut and such annulus the lower ends of the springs are gripped. The upper ends of the springs take over and are localized by tubular sections $g$, each provided with a rigid collar $g'$ and having one end screw-threaded and passed through openings in the rim $h$ of the wheel (to which the spokes are secured by any preferred means) and receive retaining-nuts $h'$, through which said tubular sections are held rigidly in place. A covering is provided for such springs and annulus $c$, preferably by securing separate strips $k\ k'$ of elastic material with their lower edges between the metallic annulus $c$ and rubber annulus $b$ of the tread and their upper edges cemented to the outer face of the rim $h$, which is preferably concave in cross-section.

A tire constructed according to the foregoing will have many advantageous features of novelty over the tires at present in use in that but one covering need be used, and that may be of thin and cheap material, either leather or rubber, either of which will answer the purpose, and the separate side pieces thereof being readily detached from the rim allow of access to the interior.

I would also point out that with the conical form of spring there is no possibility of the coils touching each other upon compression, since each coil thereof is free to move downward within the one beneath, thus securing the greatest amount of elasticity. I prefer, however, to make the springs regulable in their resistance to compression, thereby insuring the regulability of the resiliency of the complete tire and enabling same to be regulated to withstand the weight of and at the same time afford an easy cushion for any rider. To this end I diminish a portion of the opening $g^2$ of the tubular section $g$ to form a shoulder $g^3$ and a bolt $p$, having one end squared, as at $p^2$, and a rigid collar $p'$, formed thereon about midway of its length, is passed through such opening $g^2$ and is of such a length that when the collar $p'$ comes into contact with the shoulder $g^3$ the head $p^2$ will project through such opening $g^2$. The other end of this bolt is screw-threaded to receive a screw-threaded collar $p^3$, having two radially-projecting arms $p^4$ cast thereon, while the tubular section is slitted on either side, as at $g^5$, in order to accommodate and guide the arms of such collar $p^3$, which is screwed upon the bolt before such bolt is passed through the opening $g^2$ in such tubular section. After these parts have been assembled in the manner just described the free end of the spring, the other end of which is screwed to the tread, as before mentioned, is made to take over such tubular section $g$ and will then bear upon the arms $p^4$ of the collar $p^3$, such arms being extended sufficiently to receive such spring. By turning the bolt $p$ in one direction the collar $p^3$ will be caused to travel along same toward the end thereof and thereby compress the spring and increase its power of resistance, or by turning the bolt in the opposite direction the power of resistance thereof may be diminished.

It is obvious that many changes in the construction of the several parts and the assembling thereof may be made in the construction of my tire proper or the means for regulating the resiliency thereof varied to a considerable extent without departing from the spirit of my invention.

What I claim is as follows:

1. In combination with the rim of a wheel, a series of guides secured thereto, a series of sections adjustable longitudinally of said guides, a series of helical springs one end of each of which takes about one of said guides and bears upon one of said adjustable sections and the other end of each being connected to a tread, for the purpose set forth.

2. In combination with the rim of a wheel, a tread and an annulus located inside of and in contact with said tread, a series of guides secured to said tread, a series of sections adjustable longitudinally of said guides, a series of helical springs one end of each of which takes about one of said guides and bears upon one of said adjustable sections and the other end of each being connected to said annulus and a covering for said springs consisting of a pair of separate strips, the inner side edges whereof are connected to said rim and the outer side edges confined between said annulus and tread, for the purpose set forth.

3. In combination with the rim of a wheel, a series of guides carried by said rim, a series of bearing-sections carried by said guides and adjustable longitudinally thereof, a series of helical springs located between said rim and tread and each adapted to bear at one end upon the inside of said tread and having the outer end thereof encircling the end of one of said guides and bearing upon said adjustable bearing-section and means for adjusting said bearing-sections, for the purpose set forth.

4. In combination with the rim of a wheel such rim having openings therethrough, a series of guides each consisting of a slitted tubular section provided with a rigid collar and having one end screw-threaded and adapted to project through the openings in the rim to receive a retaining-nut thereon, a portion of the opening through said tubular section being diminished to form a shoulder; a bolt having one end projecting through said diminished opening and finished in a squared head; a collar formed rigidly upon said bolt; the other end of said bolt being screw-threaded, a collar adapted to be screwed upon said bolt and having radially-projecting arms passing through the slits in said tubular section, a series of helical springs one end of each of which takes about one of said tubular guides and bears upon the said arms and their other ends being connected to a tread, and a covering for said springs connected to said rim and to said tread, for the purpose set forth.

5. In combination with the rim of a wheel such rim having openings therethrough, a series of guides each consisting of a slitted tubular section provided with a rigid collar and having one end screw-threaded and adapted to project through the openings in the rim to receive a retaining-nut thereon, a portion of the opening through said tubular section being diminished to form a shoulder; a bolt having one end projecting through said diminished opening and finished in a squared head; a collar formed rigidly upon said bolt; the other end of said bolt being screw-threaded; a collar adapted to be screwed upon said bolt and having radially-projecting arms passing through the slits in said tubular section, a series of helical springs one end of each of which takes about one of said tubular guides and bears upon said arms, and their other ends being connected to a tread, and a covering for said springs consisting of a pair of separate strips, the side edges whereof are connected one to said rim and the other to said tread, for the purpose set forth.

6. In combination with the rim of a wheel such rim having openings therethrough, a series of guides each consisting of a slitted tubular section provided with a rigid collar and having one end screw-threaded and adapted to project through the openings in the rim to receive a retaining-nut thereon, a portion of the opening through said tubular section being diminished to form a shoulder; a bolt having one end projecting through said diminished opening and finished in a squared head; a collar formed rigidly upon said bolt; the other end of said bolt being screw-threaded; a collar adapted to be screwed upon said bolt and having radially-projecting arms passing through the slits in said tubular section, a series of conical helical springs one, the smaller, end of each of which takes about one of said tubular guides and bears upon the said arms and their other ends being connected to a tread, and a covering for said springs connected to said rim and to said tread, for the purpose set forth.

7. In combination with the rim of a wheel, such rim having openings therethrough, a series of guides each consisting of a slitted tubular section provided with a rigid collar and having one end screw-threaded and adapted to project through the openings in the rim to receive a retaining-nut thereon, a portion of the opening through said tubular section being diminished to form a shoulder; a bolt having one end projecting through said diminished opening and finished in a squared head; a collar formed rigidly upon said bolt; the other end of said bolt being screw-threaded; a collar adapted to be screwed upon said bolt and having radially-projecting arms passing through the slits in said tubular section, a series of conical helical springs one, the smaller, end of each of which takes about one of said tubular guides and bears upon the said arms and their other ends being connected to a tread, and a covering for said springs consisting of a pair of separate strips the side edges whereof are connected one to said rim, and the other to said tread, for the purpose set forth.

Montreal, June 8, 1896.

CHARLES TAYLOR.

In presence of—
WILL P. McFEAT,
FRED. J. SEARS.